United States Patent
Schmidt et al.

(10) Patent No.: US 6,418,457 B1
(45) Date of Patent: Jul. 9, 2002

(54) DOCUMENT STORAGE AND PROCESSING SYSTEM FOR INVENTORS THAT UTILIZE TIMESTAMPS AND DIGITAL SIGNATURES

(75) Inventors: Richard Schmidt; Deborah M. Sutter; Leonid Vayner, all of New York; Thomas Cahill, Brooklyn, all of NY (US)

(73) Assignee: The Chase Manhattan Bank, NY (US)

( * ) Notice: Subject to any disclaimer, the term of this patent is extended or adjusted under 35 U.S.C. 154(b) by 0 days.

(21) Appl. No.: 08/988,041

(22) Filed: Dec. 10, 1997

(51) Int. Cl.$^7$ .............................................. G06F 15/00
(52) U.S. Cl. ........................ 707/512; 707/500; 705/51
(58) Field of Search .......................... 707/512, 3, 513, 707/500; 705/1, 65–76, 51; 380/3, 4, 21, 23, 25, 29, 43, 50, 49; 709/201, 202; 713/150–170, 178–182

(56) References Cited

U.S. PATENT DOCUMENTS 5,136,647 A * 8/1992 Haber et al. ................... 380/49
5,748,738 A * 5/1998 Bisbee et al. .................. 380/25
5,781,630 A * 7/1998 Huber et al. ................... 380/23

* cited by examiner

*Primary Examiner*—Hosain T. Alam
*Assistant Examiner*—Alford W. Kindred
(74) *Attorney, Agent, or Firm*—Dickstein, Shapiro, Morin & Oshinsky, LLP

(57) ABSTRACT

A computerized document storage system for use by inventors to store their work on an invention and to secure their claim to a date of invention, the system comprising a document creator to enable the inventor to describe his invention in a document, a document saver that stores the document with a digital signature of the inventor and a time stamp. The saver prevents any further modification of the document except an addition of: a witness statement, a digital signature, and a time stamp. The system also includes a witness document modifier that only allows the witness statement, the digital signature and the time stamp to be added to a stored document. A document viewer is also included to list the documents stored in the system and to allow the documents to be read.

2 Claims, 15 Drawing Sheets

FIG. 5i

Lotus Notes-Patent Development Notebook

File Edit View Create Actions Text Window Help

Created by Richard Q. Schmidt/CHASE on 12/03/97 12:26 PM.

Enter Witness Information:

Important: To add witnesses, use the "Add a Witness" button.
Failure to do so may lead to undesirable results Selected Witnesses:

Add a Witness

Witness Name(s):

Mail Comments:

Send Mail Notification Now

Witness Information edited by Richard Q. Schmidt/CHASE on <none>

Use the Add a Witness button to look-up and add witnesses to the witness list.

FIG. 5j

View Category (disclosure number, title, inventor, subject, project, or date)

Disclosure line associated with first name of view category

Disclosure line associated with first name of view category

Disclosure line associated with first name of view category

View Category (disclosure number, title, inventor, subject, project, or date)

Disclosure line associated with second name of view category

Disclosure line associated with second name of view category

DOCUMENT STORAGE AND PROCESSING SYSTEM FOR INVENTORS THAT UTILIZE TIMESTAMPS AND DIGITAL SIGNATURES

BACKGROUND OF THE INVENTION

Traditionally inventors kept their notes in a bound notebook with sequentially numbered pages to provide proof of their inventive progress. The pages were signed and dated by witnesses, with all blank areas filled in to prevent any challenge that the material on a page was actually recorded at a date later than that recorded on the page. Persons developing computer code could record their ideas in their patent notebook and then type the code into the computer. Or they could get a printout of their code and paste it into their notebook.

When it came time to apply for a patent, the inventor would type up a disclosure to send to the patent attorney and forward the paper or electronic copy to the attorney. The formal application prepared by the attorney would be returned to the inventor for approval and then forwarded to the Patent Office.

The advancing computer technology suggested that the traditional patent notebook could be emulated in electronic form with advantages over the prior art. Carrying the traditional notebook around to find a Witness to sign a page, waiting for the Witness to read and sign the material, typing up material for the patent disclosure that had been entered into the notebook, all took time that could be saved by using a modern network-based electronic database tool.

Key features of the electronic notebook would be: 1) Time stamping of the entered data, 2) Confidence that the data was unaltered after the date of the time stamp, 3) Confidence that no data was removed after being entered and time stamped, 4) Ability to accept Witness signatures for entered material with an irrefutable time stamp indicating the time of witnessing, 5) Reliable storage to prevent loss of this valuable asset, 6) Identity of author and Witnesses assured via password security.

Additionally, it was desired to: 1) Make collaborative development possible over a computer network with the same security of a personal notebook that could be kept in a safe, 2) Provide supervisory capability, 3) Provide selective witnessing over the network, 4) Make it part of a company-wide filing system to provide a searchable archive of in-process and completed applications.

The anticipated advantages were: 1) Ready collaboration over large distances as international networks could provide a virtual office, 2) Single entry of information that serves for the roles of original documentation, development and disclosure, 3) Rapid information dissemination, modification, and approval; not limited by the physical constraints of the traditional notebook, 4) Use of electronic tools such as spelling and grammar checkers, drawing programs, etc., 5) Reducing proofreading time via the use of word processor revision markers, 6) Electronic exchange with the attorneys of all documents, 7) Electronic search to replace manual search for things we've done and want to look up.

SUMMARY OF THE INVENTION

In view of the shortcomings of the prior art the current invention provides an electronic networked notebook database with stringent security features to protect the secrecy of a developer's material; safeguards to prevent modification of data once it is stored in the database; time stamping of the material at the time that it is stored into the database; collaborative capability in that Witnesses can be assigned to see and provide legal witness to data within the database; utilization of a standard reliable networking tool in a production environment with regular backing up of data to prevent loss; identity of authors and Witnesses provided by passwords; four security levels to provide Administrator, Leader, Worker, and Witness levels of access to the database. A separate database is deployed for each development group or project that must have separate access privileges.

A variation of the notebook database, set up with divisions for Disclosures, Applications, Patents, and Abandoned invention data, provides a company-wide archive of all data that pursues a patent. This patent database provides electronic search and retrieval of data by various means, e.g. inventor's name; disclosure, application, or patent number; title; keywords; content; date. This database is read-only accessible by users, since they are only retrieving information. No Witnesses are required for the documents, nor are the Worker or Leader categories required as in the notebook database. The Administrator is the sole person that is given the rights to modify the patent database, thus simplifying its control.

As a further guarantee of the integrity of the data within the notebook database, certain documents of exceptional value would be certified via an electronic Public Notary to provide independent certification of the date and non-modification of the document in the database.

Images can be pasted into the notebook database document as it is prepared, so that further clarity can be incorporated with the text. The text and images can readily be copied into other electronic documents for easier production of a disclosure document to send to an attorney to prepare a patent application. All word processing features of the networked database have been retained to provide the greatest facility to the author with minimal training.

The notebook database is designed to prevent any modification of a document once it is saved. The material in the saved document can not be altered or deleted. Standard backup procedures of the production software provide protection of the stored data against loss, and through archived copies provide an audit trail to further lend credence to the claim that the data is unaltered.

Accordingly, it is an object of the present invention to create a document storage system that allows documents to be created and protected against any further modification except for the addition of a Witness statement, time stamps and digital signatures.

It is another object of the invention to only allow a modification to a document by adding a Witness statement, time stamps and digital signatures.

It is another object of the invention to designate people into different access levels.

It is another object of the invention to allow access to the documents to be dependent on specified access levels.

Another aspect of the invention is to restrict the creation of a document to designated individuals.

Yet another object of the invention is to allow limited access to change designations of people.

Still another object of the invention is to allow read-only access to designated individuals.

Another object of the invention is to allow different displays of accessible documents.

Yet another object of the invention is to allow the disclosure information to be entered into another database leading to patent prosecution.

It is another object of the invention to allow different levels of access for the patent documents.

It is still another object of the invention to allow read-only access to patent documents.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangement and instrumentality shown.

FIGS. 5a–5j show computer display screens that depict the creation and handling of documents in the notebook database document creation, display, and reading and handling procedures.

DESCRIPTION OF PREFERRED EMBODIMENT

The notebook database is an electronic replacement for the traditional inventor's notebook. Four categories of users are usually defined: Administrator, Leader, Worker, and Witness. The preferred embodiment uses Lotus Notes (trademark of a Lotus Development Corporation) to form the collaborative database with positive identification under user assured via a password.

Figure 1A:
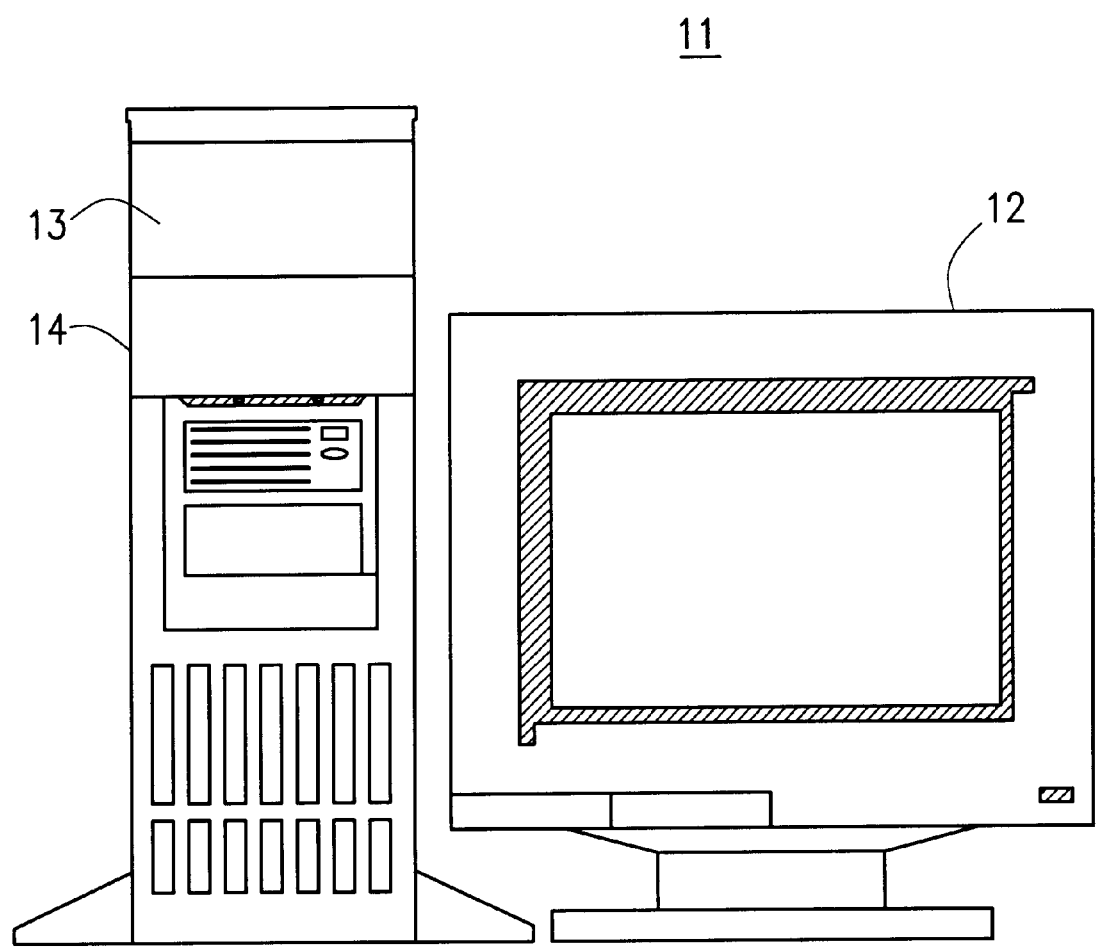
FIG. 1a is a diagram depicting a specific embodiment of the invention.

As depicted by FIG. 1a, the present invention is embodied in a computer 11 (one node of a network of computers—not shown) which has component parts of a display 12, a memory part 13, and a processing unit part 14. Any document viewing, document reading, or document listing would be performed on display 12 (at any node in the network). Document storage would be performed on memory portion 13 (and on network servers—not shown) and any processing functions would be performed by processing unit 14 (and on network servers—not shown). Although FIG. 1a depicts a solitary computer, the invention is preferably embodied among many computers within a network of such computers.

Figure 1B:
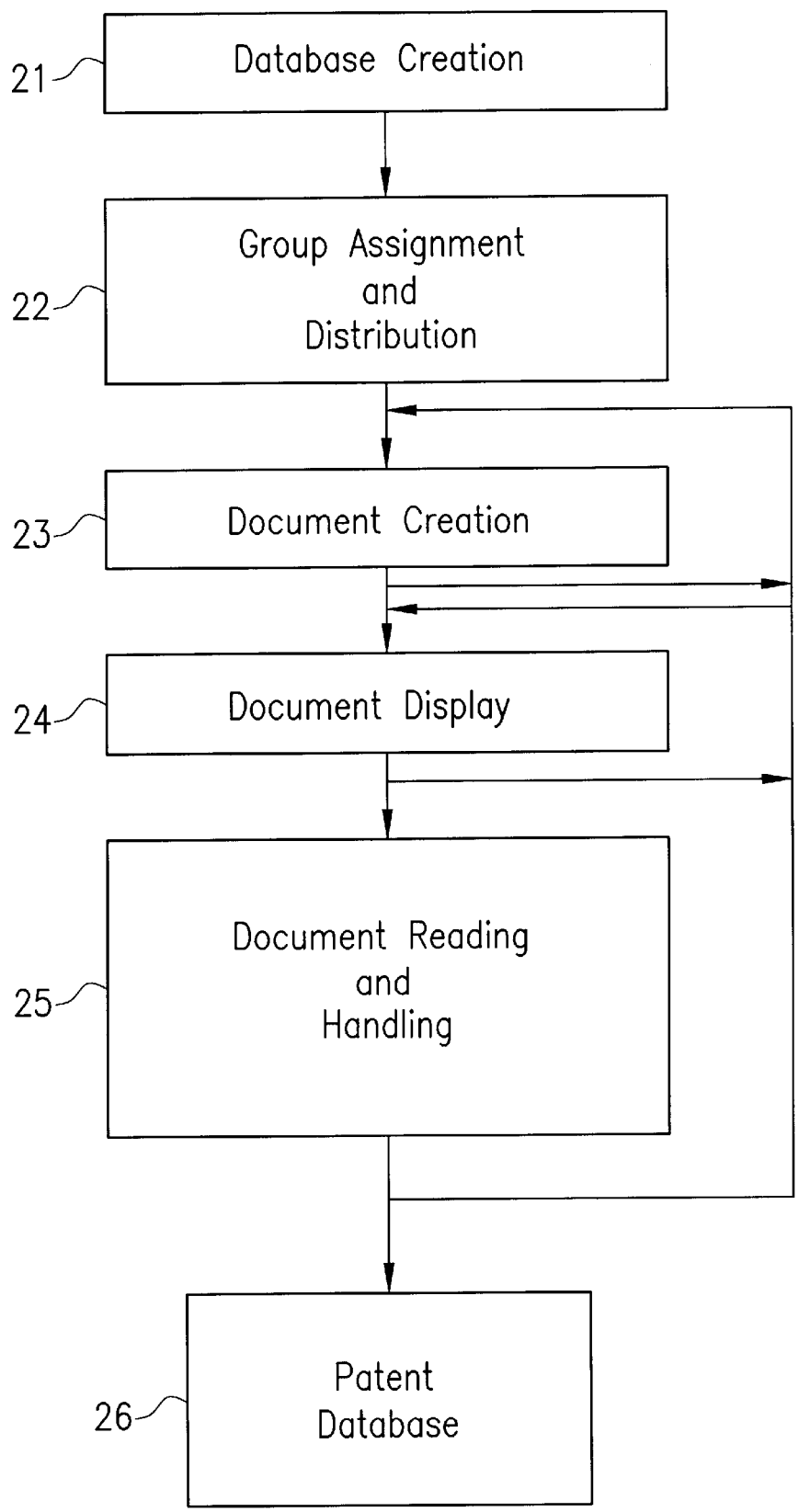
FIG. 1b is a flow diagram illustrating the procedures performed by the notebook database document storage system.

As depicted by FIG. 1b, the Administrator begins the creation process 21 and starts a new copy of the database template for a new project, forming the production database for that project. As part of that step, the Administrator creates the Administrator, Leader, Worker, and Witness groups in a suitable address book so that the access rights of those groups will be inherited by persons assigned to those groups and associated only with that specific database. A suitable address book would be Lotus Notes. The Administrator then sends an installation button and sends the Encryption Key for the database to the person designated as the Leader. Documents are encrypted when stored so that only those people possessing the encryption key for that database can view the document in a decrypted form. The Administrator normally can not access any of the documents.

The Leader performs the group assignment and selection process 22 by designating people to the roles of Leader, Worker, and Witness. To do this, the Leader places the person's name in the appropriate group(s) that were created by the Administrator in the address book. The Leader then sends the database installation button and Encryption Key to the person. Workers and Witnesses can not send the Encryption Keys on to anyone else. This reserves control of who gains access to the database for the project Leader(s). The Leader can designate him/herself as a Worker or Witness as well.

Figure 5A:
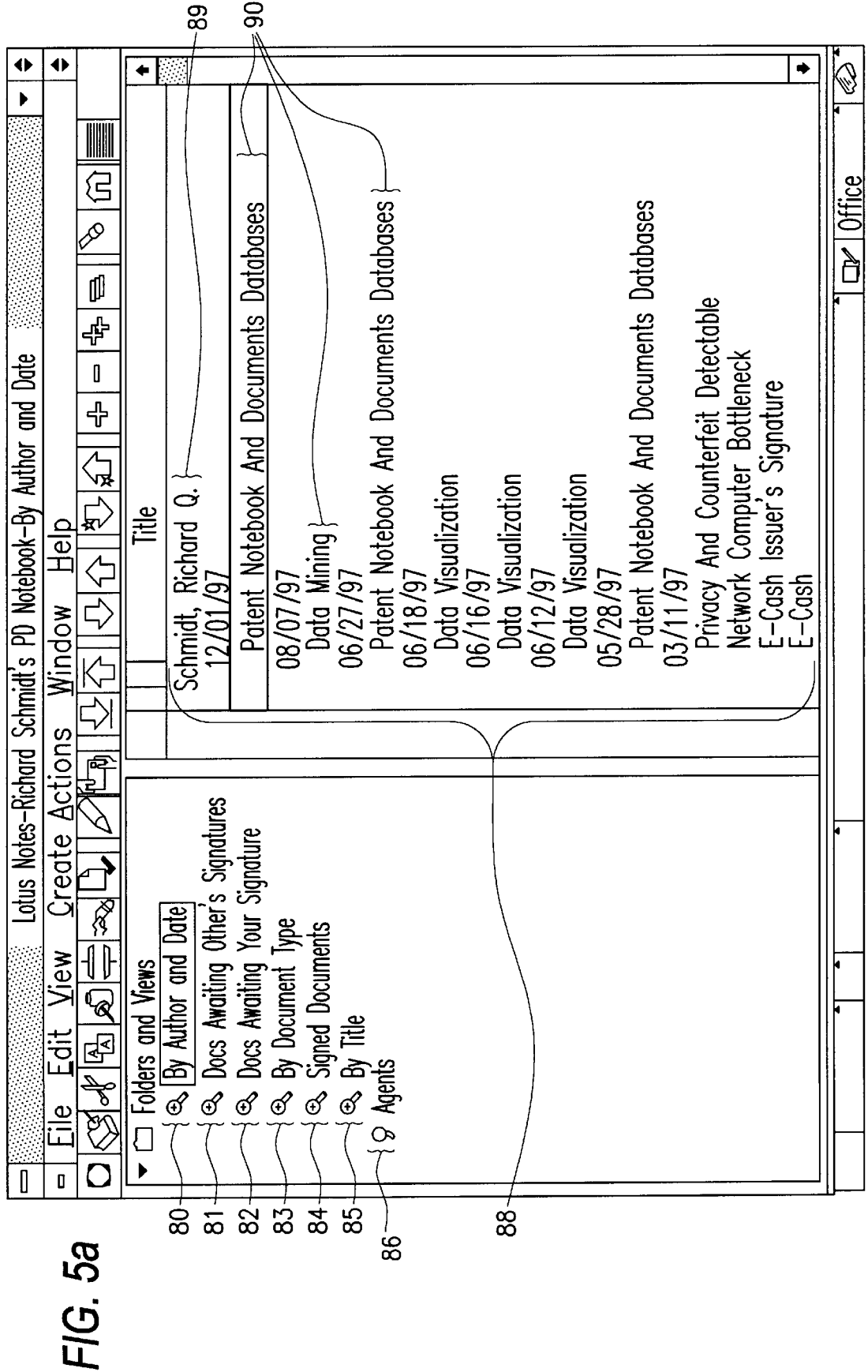

The Leader(s), Worker(s), and Witness(es) install the notebook database icon on their Desktop, e.g., Lotus Notes Desktop. They gain access to the contents of the database by accepting the Encryption Key. On a Lotus Notes Desktop, they install the database by clicking on the installation button that they receive. They open the application by double clicking on the icon which brings up the main screen (FIG. 5a).

After installing the database on their respective computers, each individual can access the documents in the database depending on their designation to the four groups (roles) indicated above. Only a Worker can create documents and add them to the database in the document creation step 23.

Figure 2:
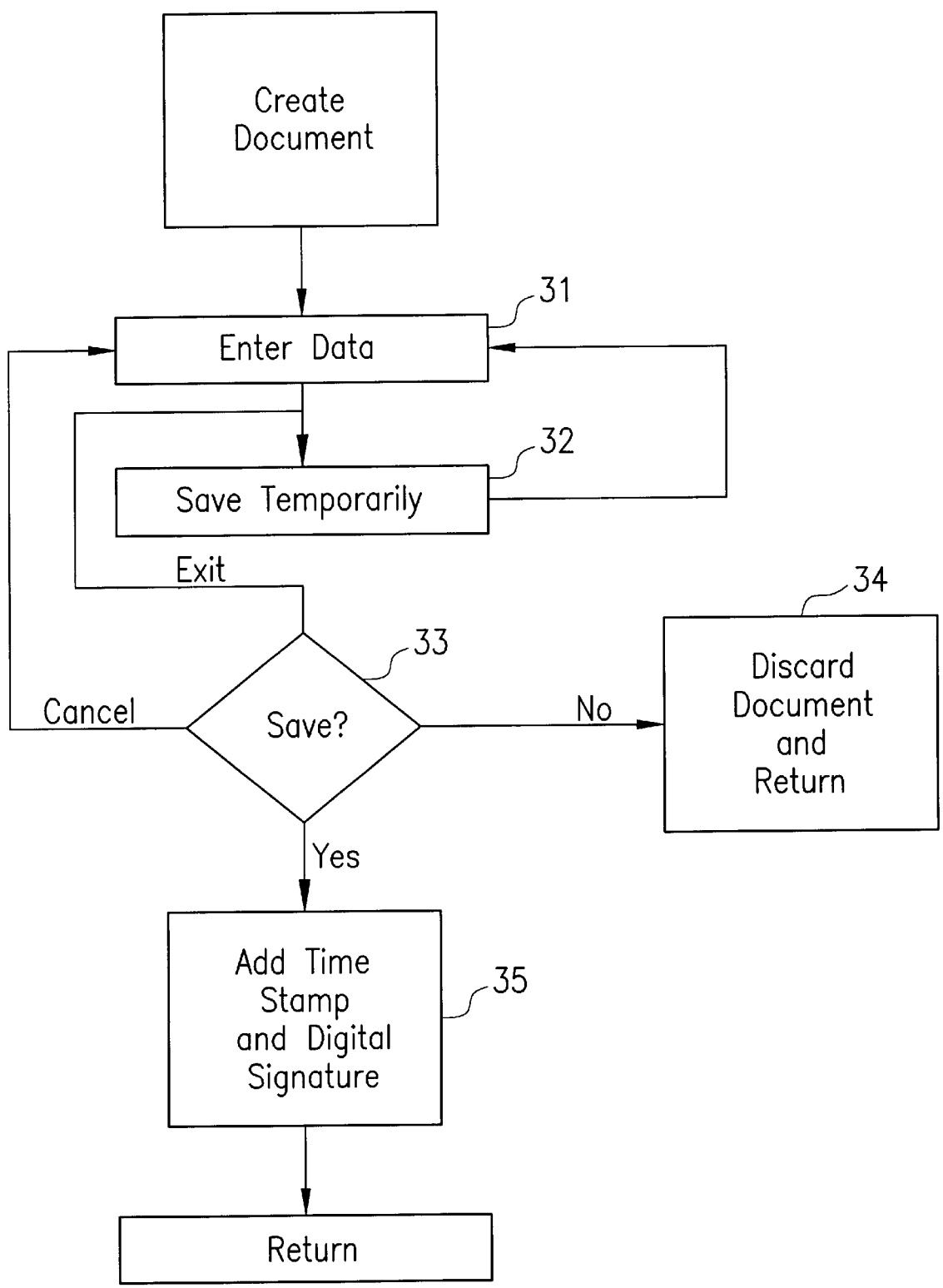
FIG. 2 is a flow diagram illustrating the notebook database document creation step.

FIG. 2 is a flow chart showing the document creation step 23. After creating the document, the Worker will be able to enter in step 31 and temporarily save in step 32 the data that he wishes to record on the particular project that he is involved in. When the Worker wishes to record his data into the project database, the Worker will be asked 33 if he wishes to save his work into the project database. If he wishes to exit without saving the document is discarded and is not stored into the database 34. If the Worker wishes to continue working (cancel), he will be able to continue working without the document being stored into the database. If the author indicates that he wishes to save and exit, then a time stamp and digital signature is added 35 to the document before it is saved.

Referring back to FIG. 1b, after one or more documents have been stored to the database, only certain documents will be displayed to the individual in the document display step 24. The documents that are displayed to the individual are selected based on the groups to which he belongs. A document will be displayed to the individual if the individual is listed as a Leader, author or Witness to the document.

Figure 3:
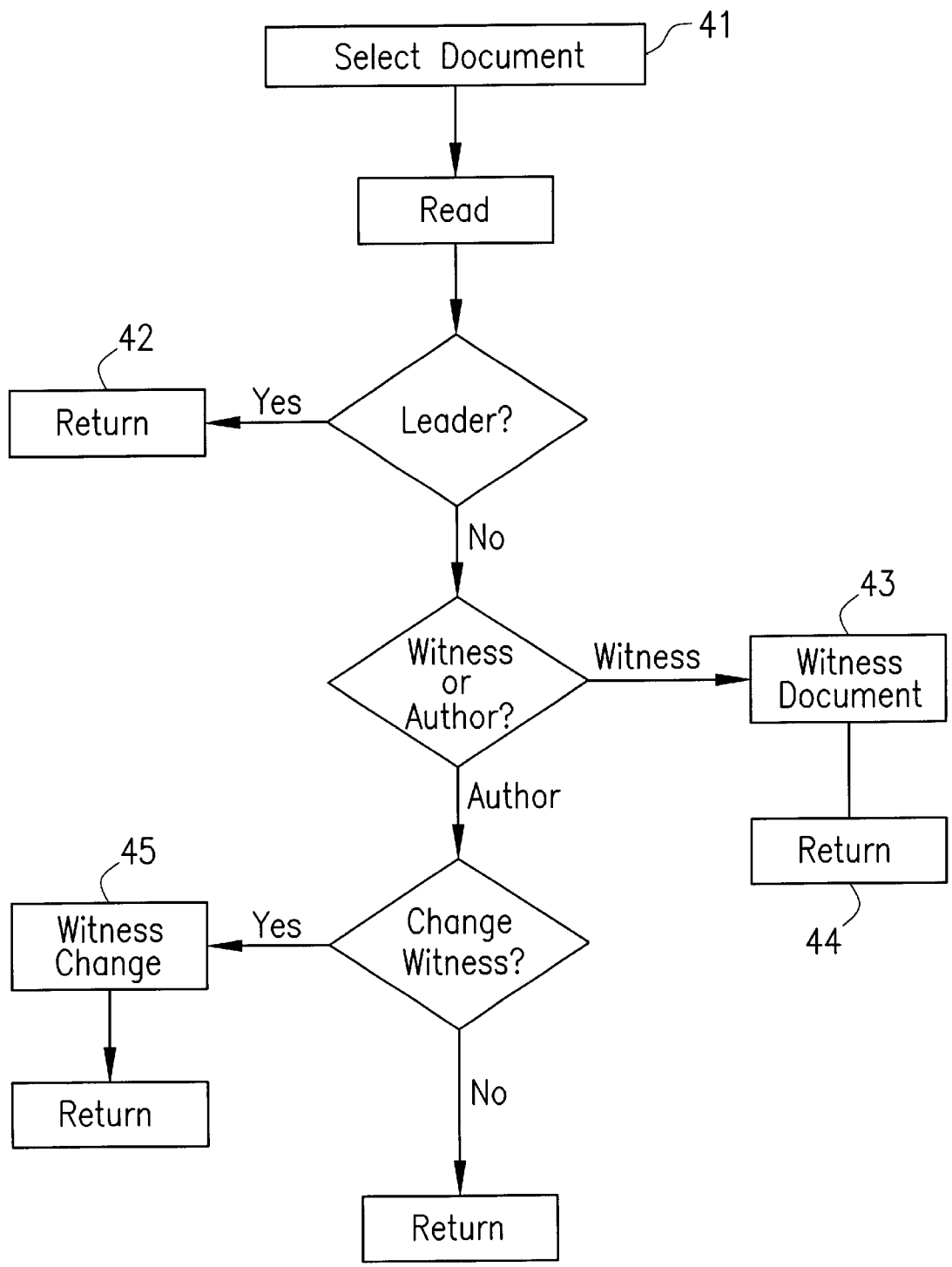
FIG. 3 is a flow diagram illustrating the notebook database document reading and handling procedures.

FIG. 3 is a flow chart depicting the process of document reading and handling (step 25). If a document is displayed to an individual in the document display step 24, then that individual can read the document. To do so, the individual must select 41 the document to read it. Users may possess more than one role of Administrator, Leader, Worker or Witness. However, it is not intended for the Administrator to have any role other than as Administrator. If the individual possesses the Worker role or Witness role to that document, then he can act further on this document. If the individual possesses only the Leader role, then the individual can act no further and the only option 42 is to return back to the document display step. If the individual possesses the Witness role, he is given the option 43 to witness the document. In that procedure, the Witness can agree to witness the document and affix a Witness statement, a digital signature and a time stamp to the document. After that, the only option 44 is to return to the document display step.

If the individual is the author of that document, he has the option 45 of changing the Witnesses to the document. If he chooses not to, then he can return to the document creation step or the document display step. If he chooses the option 45 of changing the Witness list, he can cancel Witnesses or add a new Witness to the list.

The description provided so far has only addressed the notebook database (steps 21–25 of FIG. 1b) which is intended as the direct electronic replacement for the inventor's notebook of the prior art. A second database, a patent database (step 26), is needed to make the electronic documents that proceed on to become patent applications, accessible to a larger population within the business. Since patent applications pass through four stages in the process, the patent database is therefore categorized into four sections: Disclosure, Application, Patent, and Abandoned.

Figure 4:
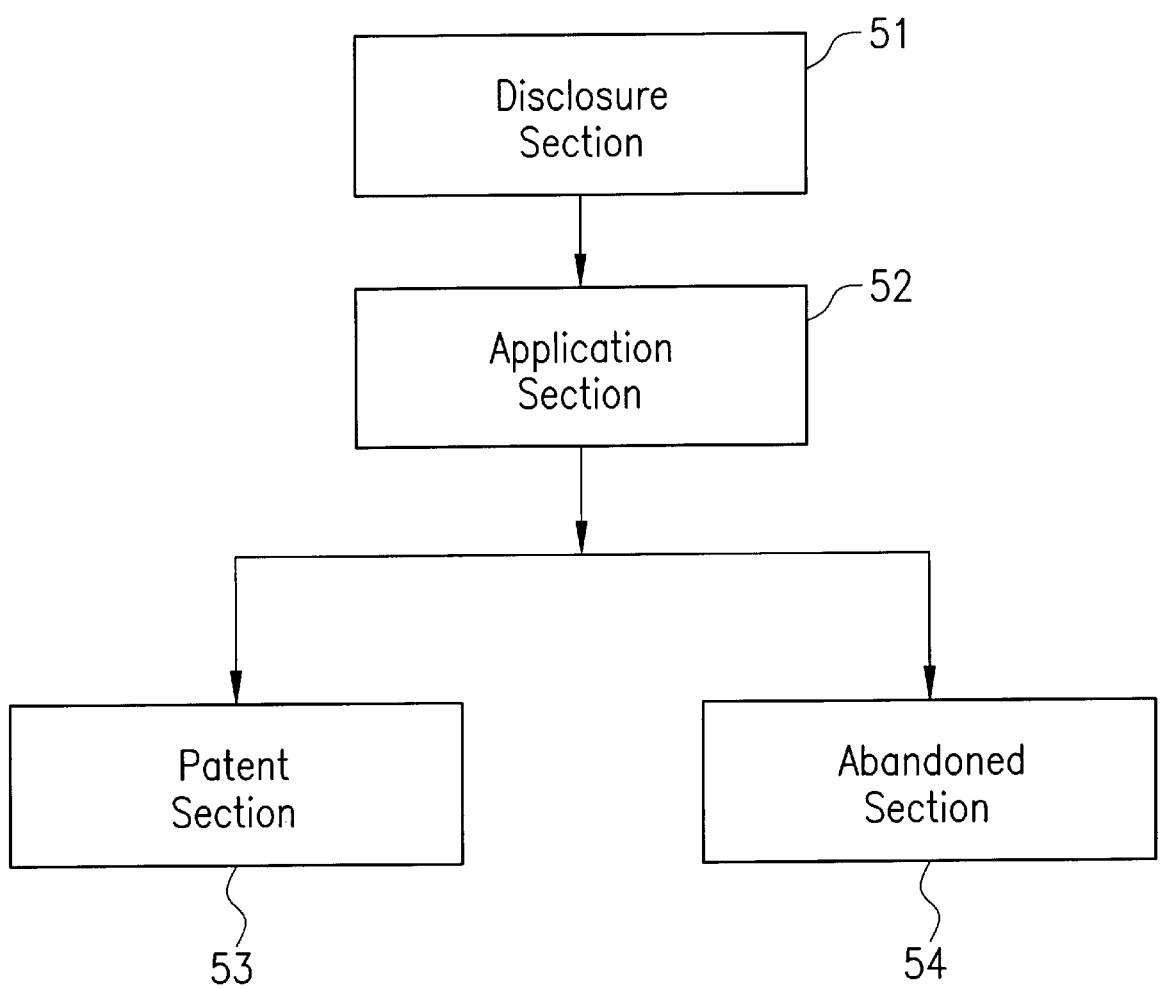
FIG. 4 is a flow diagram illustrating the patent database processes.

As depicted in FIG. 4, the Disclosure section 51 contains the initial release of information to the patent attorney from the inventor(s). This information is preferably obtained from the document storage system described above. A number is automatically assigned sequentially to the disclosure for reference purposes. When documents are entered, the displayed screen requests a title, inventor(s), subject(s), and project(s) to be provided by the person entering the document. This data and disclosure number are then used to form an identifying disclosure line for displaying as the content of the database. The length of the line may become longer than the width of the screen, therefore, the line is broken after the last full word that fits on the screen. The line is then continued on the following line(s) following a preferable five character indent for clarity of display. The disclosure lines of the documents can then be viewed in disclosure number, title, inventor, subject, project, or date order using the sorting capability of the software. FIG. 5j depicts a display format.

For multiple inventors, subjects, and projects, the same disclosure line data will appear against each name listed in the view of its category. The date is assigned at the time the disclosure is sent to the attorney, thus the date and disclosure number may provide different chronological sequences. The Disclosure section of the database (prior to moving to another section) will contain all revisions of the disclosure with the date of revision providing the discriminate between documents. If all communication with the attorney is electronic, then a full record of replies and submissions will be stored. All documents associated with a particular disclosure number are always kept together as a group. Double clicking on a disclosure line in the display changes the display to list all of the documents in chronological order for that disclosure group. Pressing the escape key on the keyboard returns the display to that of the disclosure lines.

The date sort places the disclosure number groups in the order of when the disclosure is sent to the attorney. If the disclosure is later divided, it is treated as a new disclosure and receives a new number and date. Divided disclosures may have a different title, inventor(s), subject(s), and project(s). Cross referencing is provided by disclosure number retained in each document automatically, so that inquiries to find subsequent divisions, or the originating disclosure of a division is readily accomplished by the database display mechanism.

Referring back to FIG. 4, the application section 52 contains documents automatically moved from the Disclosure section when the database Administrator enters the Patent Office application serial number. Thus applications officially filed will be in this section as soon as the application number is received and entered. All the disclosure revisions of that disclosure number group are brought into this section to maintain the full history of the application. All office actions (if available electronically) and the responses are stored in this section, grouped by disclosure number, throughout the examination phase. The designations "in process", "allowed" or "abandoned" can be assigned to an application. Assigning "allowed" to an application that has been allowed by the patent office enables distinguishing it during the ensuing period prior to publishing as a patent. Assigning "abandoned" automatically transfers the application group for that disclosure number to the Abandoned section. The default assignment is "in process". Documents in this section can be viewed in application or disclosure number, title, inventor, subject, project, or date order as all, in process, or allowed.

The Patent section 53 contains documents automatically moved from the Application section when the patent is published and the database Administrator enters the Patent Office patent number. All the documents associated with the disclosure number for the patent are brought into this section to maintain the full history of the application. The documents in this section can be viewed in patent, application or disclosure number, title, inventor, subject, project or date order.

The Abandoned section 54 contains documents automatically moved from the Application section when the application is dropped/rejected with no intent of further prosecution and the database Administrator assigns "abandoned" to the disclosure. All the documents associated with the disclosure number for the application are brought into this section to maintain the full history of the application. Documents in this section can be viewed in application or disclosure number, title, inventor, subject, project, or date order.

This patent database 26, set tip with divisions for Disclosures 51, Applications 52, Patents 53, and Abandoned 54 invention data, provides a company-wide archive of all documentation associated with each disclosure made by the company. This patent database provides electronic search and retrieval of data by various means, e.g. inventor's name, disclosure number, application number, patent number, title, subject, project, keywords, date. Divisions of the disclosure and the source of a division can also be automatically retrieved. This database is read-only accessible by users, since they are only retrieving information. No Witnesses are required for the documents, nor are the Worker or Leader categories required as in the notebook database. The Administrator is the sole person that is given the rights to modify the patent database, thus simplifying its control.

Figure 5B:
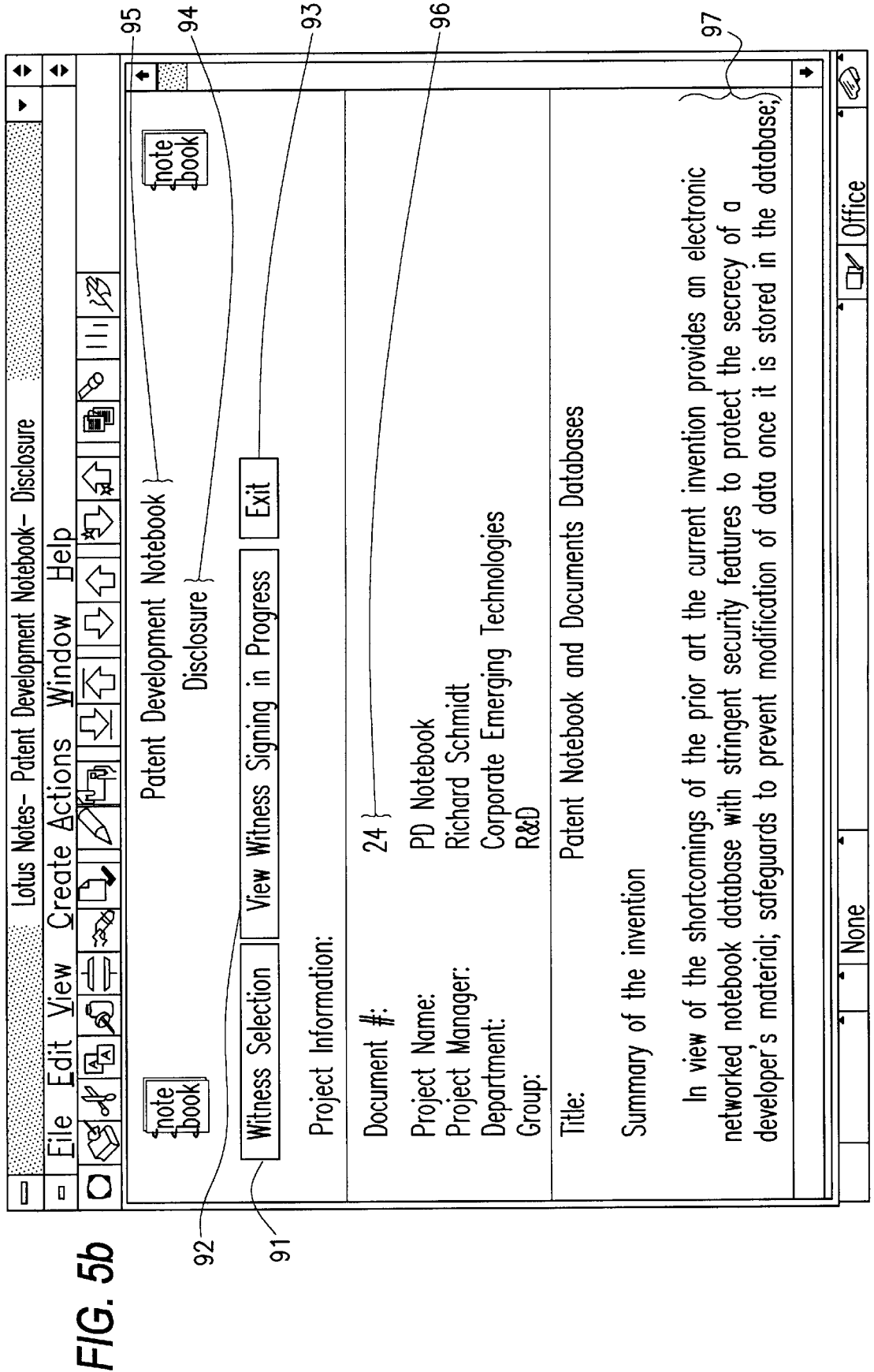

Shown in FIG. 5a is the main screen of the notebook database (steps 21–25 of FIG. 1b) as implemented with Lotus Notes version 4.0. The user is presented with the ability to see all documents to which the user has a read access right in a list 88. For a Worker category, the Worker's name 89 and document titles 90 created by the Worker will appear, as well as documents for which the Worker has been selected to be a Witness, when the option 80 "By Author and Date" is selected as shown in the figure. The documents are listed in date order, grouped under each author. Double clicking on any title will open the document for reading or designating a Witness as shown in FIG. 5b.

Referring back to FIG. 5a, the option 81 "Docs Awaiting Other's Signatures" displays a list of documents authored by the user for which the user has requested others to witness. The user can double click on any of the listed documents (not shown) to read its content, add, or cancel Witnesses.

Clicking on the option 82 "Docs Awaiting Your Signature" displays a list of documents for which the user has been requested to witness, and the user has not yet signed the document. The user can double click on any of the listed documents to read its content, and if satisfied, press a "Sign" button signifying the document has been read and understood on that date by the user. This results in a statement, "This document has been read and witnessed" being placed above the Witness' name in the Witness area below the document.

The option 83 "By Document Type" displays a list of documents under the group headings of "comment", "disclosure", "meeting minutes", "monthly summary", "progress note", or "other". The option 84 "Signed Documents" displays a list of documents authored by the user for which the user has requested others to witness, and the Witness has signed the document. The user can double click on any of the listed documents to read its content, add, or cancel Witnesses. The option 85 "By Title" lists all documents accessible by the author alphabetically by title. The option 86 of "Agents" has not yet been reduced to practice, but are designed to provide useful filters for returning a document list with characteristics described by the user.

The document shown in FIG. 5b contains a button 91 to select (designate) a Witness, which enables the Worker to designate a Witness. The Worker can review who the Worker has designated to Witness this document and whether it has been signed by pressing (clicking) the "View Witness Signing in Progress" button 92. Pressing the "Exit" button 93 (the Esc key on the keyboard does the same) returns the Worker to the main screen of FIG. 5a. The document type 94, "Disclosure" in this example, is displayed below the heading 95, "Patent Development Notebook". Documents numbers 96 are sequential, in this example "24". The body 97 of the text is displayed following this information.

Figure 5C:
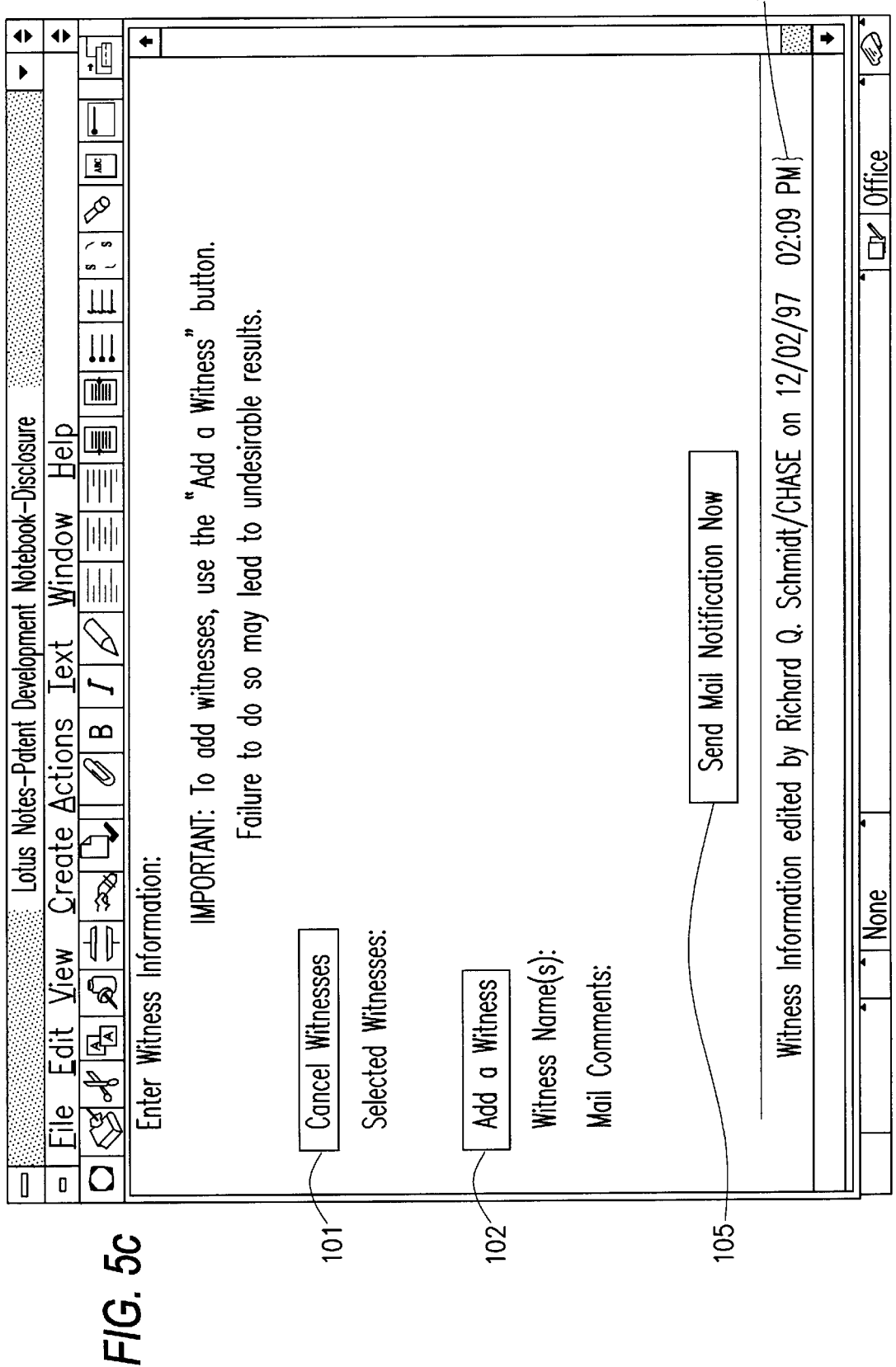

The Witness selection screen appears when "Witness Selection" button 91 is pressed and is depicted in FIG. 5c. The User can select the "Cancel Witnesses" button 101 to cancel a Witness or select the "Add a Witness" button 102 to add a Witness.

Figure 5D:
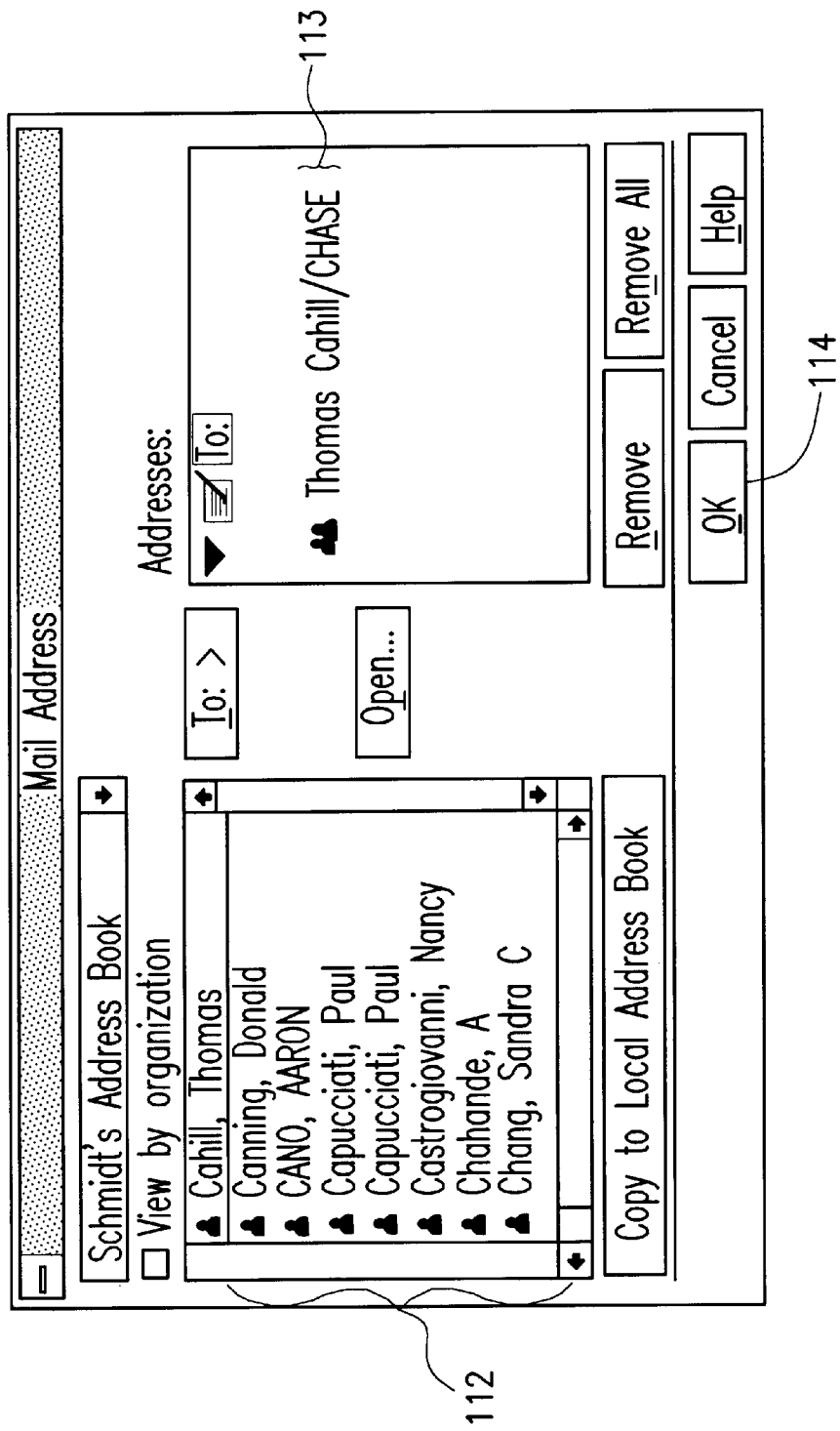

When the "Add a Witness" button is selected, the Mail Address screen shown in FIG. 5d appears. In that Screen, the Worker views the list 112 of potential names to be chosen to witness the document. After selecting the name 113 to be added, the Worker then selects the "OK" button 114 to indicate his approval of the selected name.

Figure 5E:
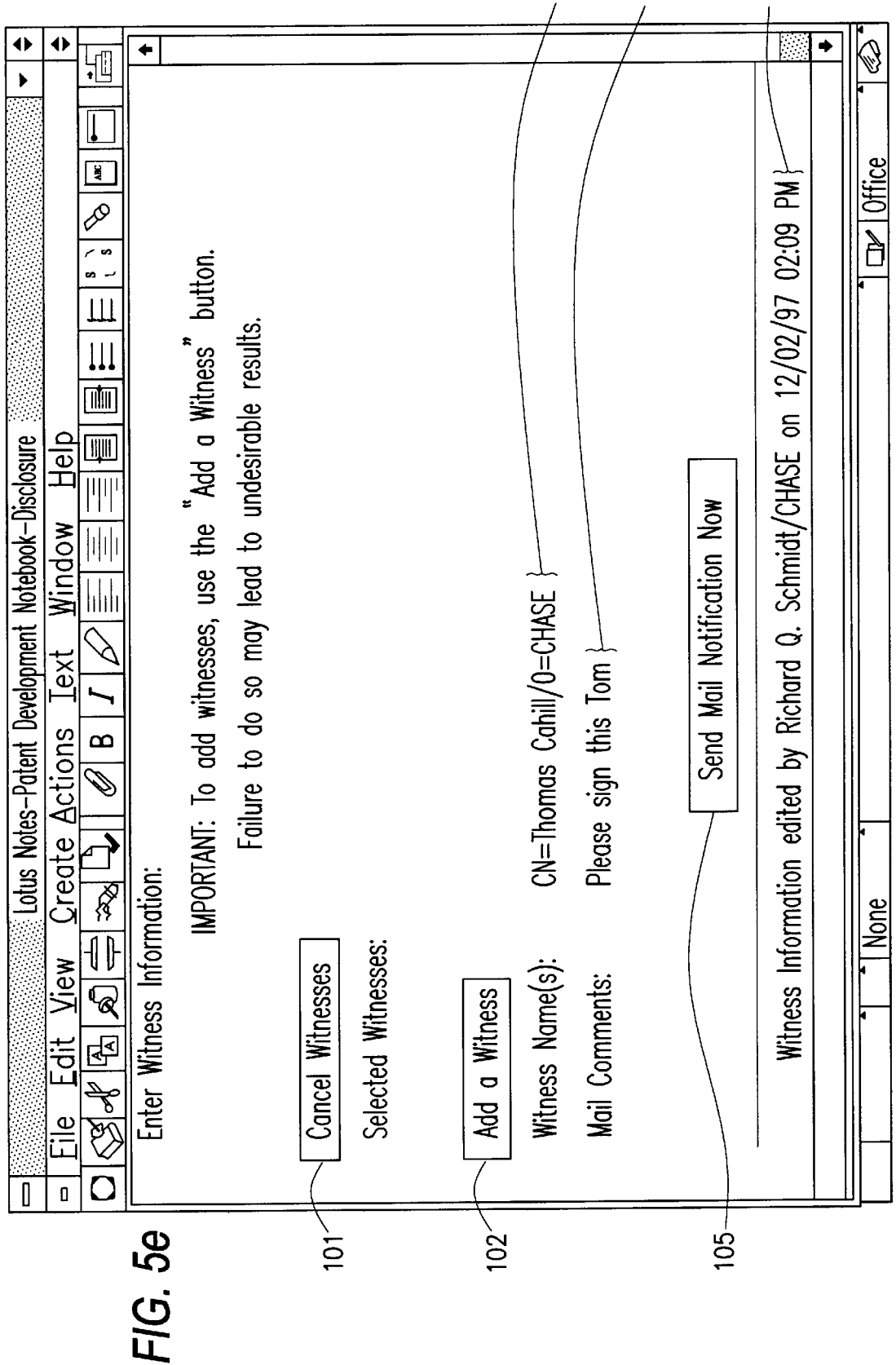

Pressing the "OK" button 114 returns the Witness selection screen with the selected Witness' name 104 as shown in FIG. 5e. A comment 103 can then be added as shown before sending an e-mail notice with a doc-link to the document to the Witness by pressing the "Send Mail Notification Now" button 105. The selection of a Witness adds a time stamp 106 at the bottom as seen in FIG. 5e. The "Cancel Witnesses" button 101, when pressed, brings up a screen (not shown) listing all Witnesses that have been notified to witness the document. Selecting a name from the list and confirming the intent to cancel the Witness, removes the Witness' ability to access the document.

Figure 5F:
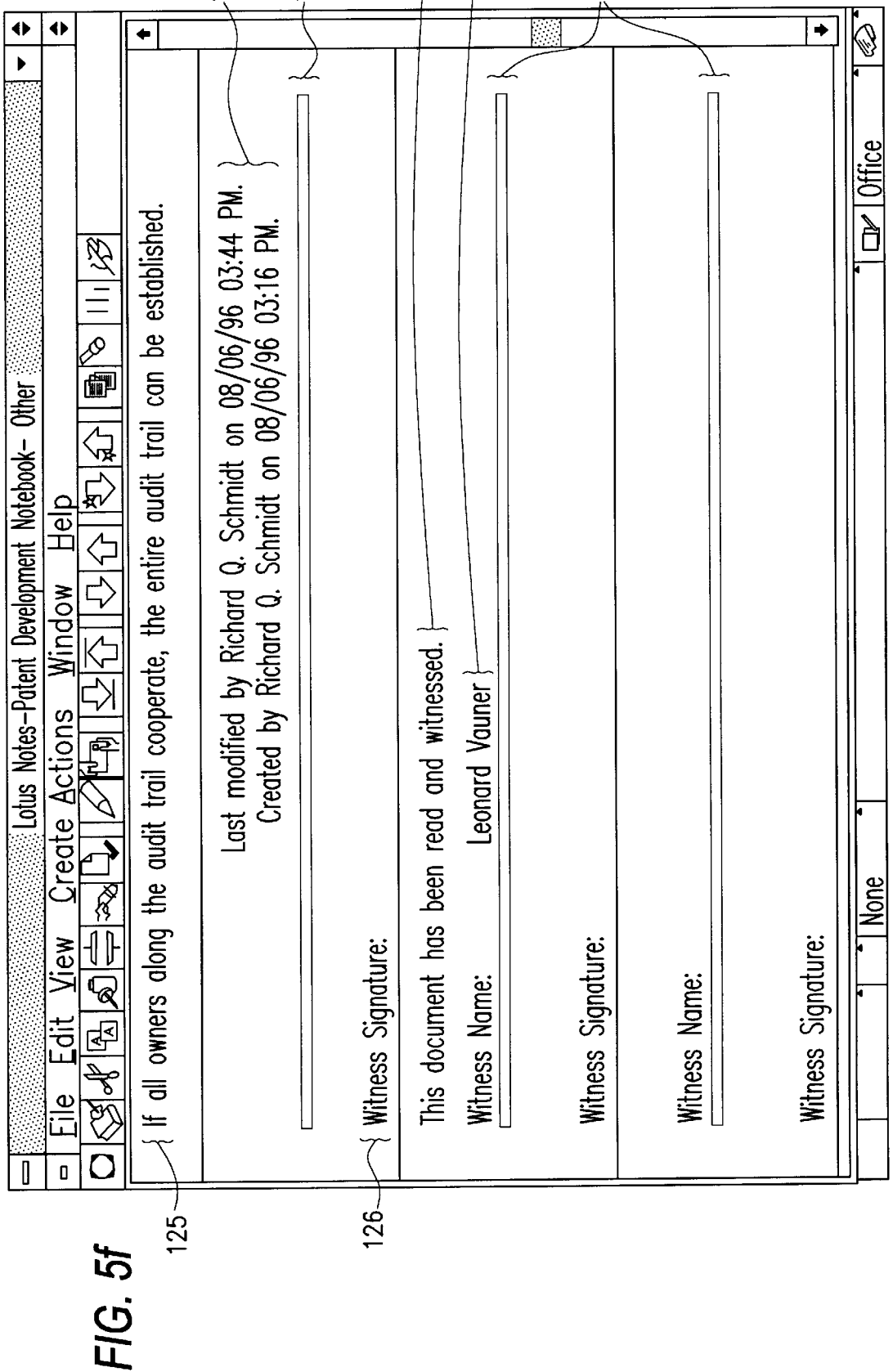

FIG. 5f depicts the Witness portion of the disclosure file. The sections for each Witness are separated by double horizontal lines 121 and start right after the end of the body 125 and its time stamp 122 as shown in FIG. 5f. When notification is sent to a Witness, the Witness' name 123 is placed after: "Witness Name:" and the Witness statement 124 located a line above reads: "This document has NOT been read or witnessed." (not shown). When the Witness signs the document, a time stamp (not shown) and the Witness' digital signature (not shown) is added to the document, the Witness statement 124 changes to: "This document has been read and witnessed." and the Witness' name also appears after: "Witness Signature:" 126. If a Witness is cancelled from the list of Witnesses the line, "This document has (NOT) been read and (or) Witnessed.", has the word, "CANCELLED" (not shown), appended to it. Although removing a Witness from the Witness list denies the Witness further access to the document, the record of the act of witnessing remains with the document. The number of Witnesses that can be selected in the preferred embodiment is 5.Canceling a Witness does not reduce the count of selected Witnesses, therefore the number of active/potential Witnesses diminishes as Witnesses are cancelled.

Figure 5G:
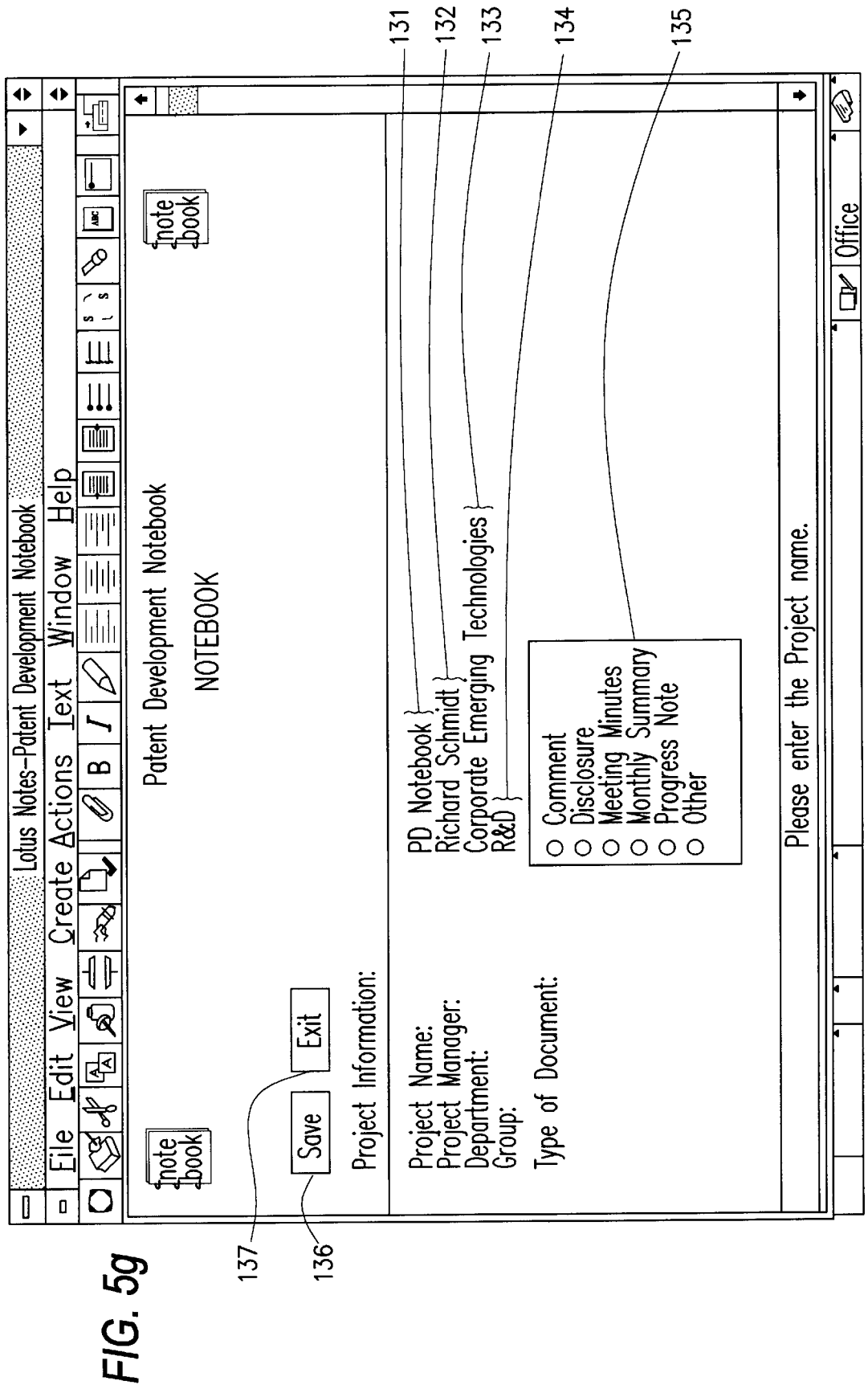

Clicking on the option "Create" on the Menu Bar of the main screen (FIG. 5a) gives a sub-menu (not shown) containing the choices: Mail, Notebook Page, Agent, Folder, and View. Selecting "Notebook Page" opens up a screen for a new document as shown in FIG. 5g. The fields for Project Name 131, Manager 132, Department 133, and Group 134 default to information previously given and can be overwritten by the user as needed. The Type of Document from the submenu 135, however, must be selected. The user may save the document to a temporary file at any time by pressing the "Save" button 136. The document is not placed into the permanent notebook database until the "Exit" button 137 is pressed. The "Exit" button 137 (the Esc key on the keyboard does the same) causes a "Do you want to save this new document?" message box to appear with a selection of Yes, No, and Cancel buttons to press. "Cancel" returns you to the document. "No" returns you to the main screen discarding the document. "Yes" returns you to the main screen (FIG. 5a) and places the document into the database with a time stamp and digital signature of the author. Once in the database the document can no longer be changed or removed.

Figure 5H:
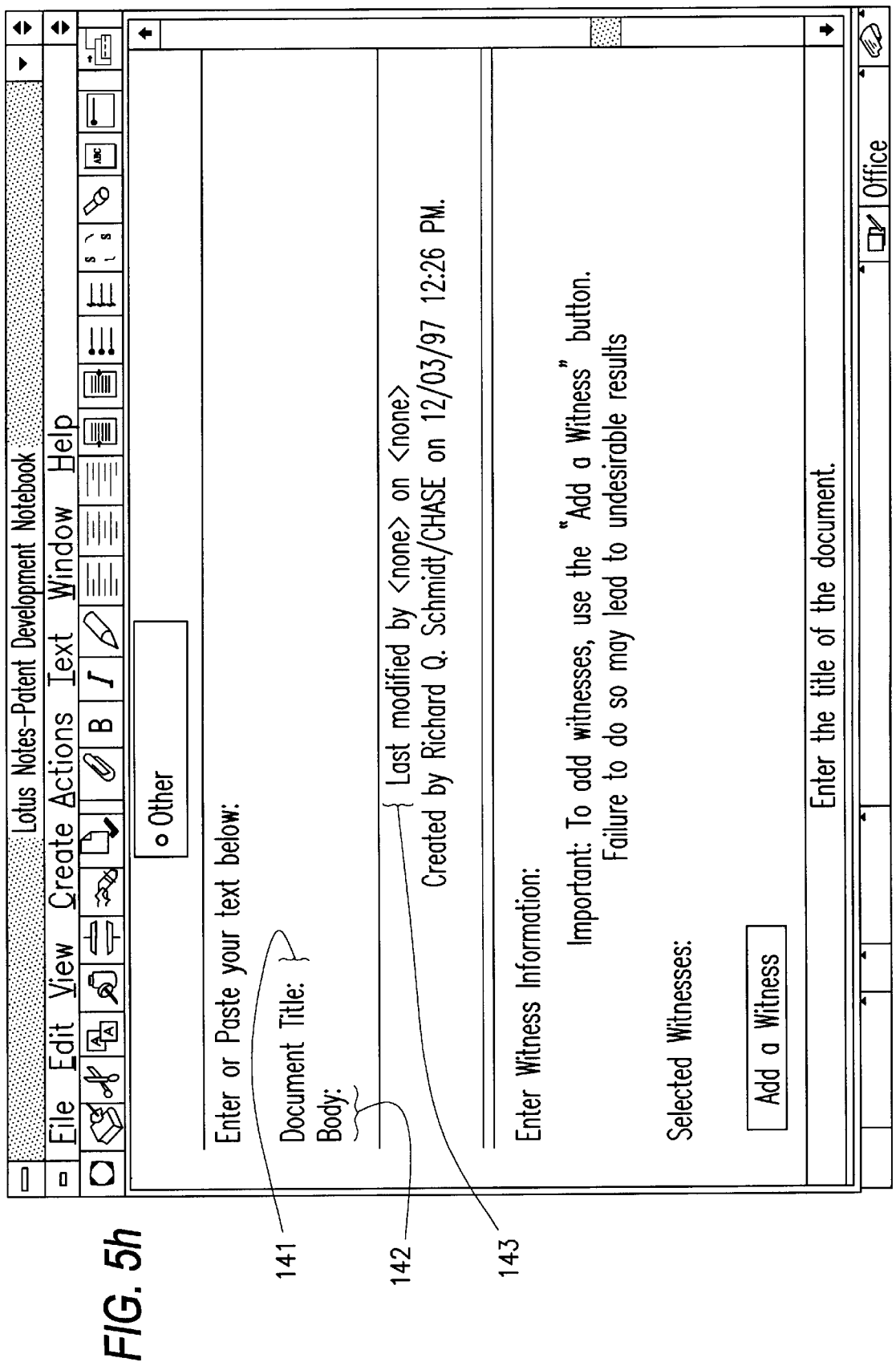

FIG. 5h shows the next portion of the screen of FIG. 5g as you scroll down in the window. The "Document Title" 141 is followed by area 142 to be filled in by the "Body". Into the "Body", the user can type in or paste in any material desired. The time stamp 143 is added automatically after the end of the body.

Following the time stamp is the Witness section illustrated in FIG. 5i. The Witness selection process has been described above for an existing document. The only difference for a new document is that you must agree to save the document to the database in order to notify a Witness of your request.

As a further guarantee of the integrity of the data within the notebook database, certain documents of exceptional value can be certified via in the electronic Public Notary to provide independent certification of the date and non-modification of the document in the database. For example, a software plug-in to Lotus Notes can be purchased from Surety Technology located in Florham Park, N.J. 07932, who provides this certification service.

The above described arrangement is merely illustrative of the principles of the present invention. Numerous modifications and adaptations thereof will be readily apparent to those skilled in the art without departing from the spirit and scope of the present invention as set forth in the appended claims.

What is claimed is:

1. A computerized document storage system for use by inventors to store their work on an invention and to secure their claim to a date of invention, the system comprising:

a document creator to enable the inventor to describe his invention in a document;

a document saver that stores the document with a digital signature of the inventor and a first time stamp and prevents any further modification of the document except an addition of a witness statement, a witness digital signature, and a second time stamp;

a witness document modifier that only allows the witness statement, the witness digital signature and the second time stamp to be added to a stored document;

a document viewer to list the documents stored in the system and to allow the documents to be read; and a group assignor to assign people to a plurality of groups, wherein the plurality of groups includes a witness group and a worker group, wherein the group assignor allows a person to be removed from a group, and wherein the group assignor only allows a person in the worker group to remove a person from the witness group.

2. A computerized document storage system for use by inventors to store their work on an invention and to secure their claim to a date of invention, the system comprising:

a document creator to enable the inventor to describe his invention in a document;

a document saver that stores the document with a digital signature of the inventor and a first time stamp and prevents any further modification of the document except an addition of a witness statement, a witness digital signature, and a second time stamp;

a witness document modifier that only allows the witness statement, the witness digital signature and the second time stamp to be added to a stored document;

a document viewer to list the documents stored in the system and to allow the documents to be read, wherein only the document viewer can display the encrypted document to be read; and a group assignor to assign people to a plurality of groups, wherein the plurality of groups includes a witness group and a worker group, wherein the group assignor allows a person to be removed from a group, and wherein the group assignor only allows a person in the worker group to remove a person from the witness group.

* * * * *